United States Patent [19]
Seidner et al.

[11] Patent Number: 5,898,473
[45] Date of Patent: Apr. 27, 1999

[54] MULTIFOCAL CORNEAL CONTACT LENS

[75] Inventors: Leonard Seidner, Manalapan, N.J.;
Maurice Poster, Jericho, N.Y.

[73] Assignee: Permeable Technologies, Inc., Morganville, N.J.

[21] Appl. No.: 08/845,335

[22] Filed: Apr. 25, 1997

[51] Int. Cl.⁶ .................................................. G02C 7/04
[52] U.S. Cl. .......................................... 351/161; 351/177
[58] Field of Search .......................... 351/160 R, 160 H, 351/161, 162, 177

[56]  References Cited

U.S. PATENT DOCUMENTS

| | | | |
|---|---|---|---|
| 3,415,597 | 12/1968 | Harman | 351/160 R |
| 3,482,906 | 12/1969 | Volk | 351/161 |
| 3,597,055 | 8/1971 | Neefe | 351/161 |
| 3,950,082 | 4/1976 | Volk | 351/161 |
| 3,984,506 | 10/1976 | Tsuetaki | 264/139 |
| 4,162,122 | 7/1979 | Cohen | 351/161 |
| 4,302,081 | 11/1981 | Tsuetaki | 351/161 |
| 4,418,991 | 12/1983 | Breger | 351/161 |
| 4,477,158 | 10/1984 | Pollock et al. | 351/161 |
| 4,525,043 | 6/1985 | Bronstein | 351/161 |
| 4,573,775 | 3/1986 | Bayshore | 351/161 |
| 4,580,882 | 4/1986 | Nuchman et al. | 351/161 |
| 4,605,524 | 8/1986 | Danker | 264/2.5 |
| 4,614,413 | 9/1986 | Obssuth | 351/161 |
| 4,618,228 | 10/1986 | Baron et al. | 351/161 |
| 4,636,049 | 1/1987 | Blaker | 351/161 |
| 4,637,697 | 1/1987 | Freeman | 351/161 |
| 4,640,595 | 2/1987 | Volk | 351/161 |
| 4,693,572 | 9/1987 | Tsuetaki et al. | 351/161 |
| 4,704,016 | 11/1987 | de Carle | 351/161 |
| 4,752,123 | 6/1988 | Blaker | 351/161 |
| 4,765,728 | 8/1988 | Porat et al. | 351/160 R |
| 4,795,462 | 1/1989 | Grendahl | 623/6 |
| 4,883,350 | 11/1989 | Muckenhirn | 351/160 R |
| 4,890,912 | 1/1990 | Visser | 351/161 |
| 4,923,296 | 5/1990 | Erickson | 351/161 |
| 4,936,672 | 6/1990 | Capez | 351/161 |
| 4,971,432 | 11/1990 | Koeniger | 351/161 |
| 5,002,382 | 3/1991 | Seidner | 351/161 |
| 5,024,517 | 6/1991 | Seidner | 351/161 |
| 5,046,836 | 9/1991 | Volk | 351/219 |
| 5,089,024 | 2/1992 | Christie et al. | 351/161 |
| 5,112,351 | 5/1992 | Christie et al. | 351/161 |
| 5,125,729 | 6/1992 | Mercure | 351/161 |
| 5,158,572 | 10/1992 | Nielsen | 351/161 |
| 5,181,053 | 1/1993 | Brown | 351/161 |

(List continued on next page.)

FOREIGN PATENT DOCUMENTS

| | | |
|---|---|---|
| 201231 | 11/1986 | European Pat. Off. . |
| 3222099 | 12/1983 | Germany . |
| WO8902251 | 3/1989 | WIPO . |

*Primary Examiner*—Scott J. Sugarman
*Attorney, Agent, or Firm*—R. Neil Sudol; Henry D. Coleman

[57]  ABSTRACT

A pair of multifocal contact lenses for a patient comprises a first corneal contact lens having a concave posterior surface and a convex anterior surface. The anterior surface is formed with a power curve having exactly two vision correction zones, namely, a circular distance vision correction zone and an annular intermediate vision correction zone contiguous with the distance vision correction zone. The intermediate vision correction zone of the first lens is concentric or coaxial with the distance vision correction zone. A second corneal contact lens of the pair also has a concave posterior surface and a convex anterior surface. The anterior surface of the second lens is formed with a power curve having exactly two vision correction zones: a circular near vision correction zone and an annular intermediate vision correction zone contiguous with the near vision correction zone. The intermediate vision correction zone of the second lens is concentric or coaxial with the near vision correction zone. The intermediate vision correction zone of the first lens and the distance vision correction zone have optical powers differing in magnitude by less than approximately 1.5 diopters. Similarly, the intermediate vision correction zone of the second lens and the near vision correction zone have optical powers differing in magnitude by less than approximately 1.5 diopters.

14 Claims, 2 Drawing Sheets

U.S. PATENT DOCUMENTS

| | | | |
|---|---|---|---|
| 5,200,773 | 4/1993 | Volk | 351/160 R |
| 5,229,797 | 7/1993 | Futhey et al. | 351/161 |
| 5,365,701 | 11/1994 | Brown | 451/28 |
| 5,404,183 | 4/1995 | Seidner | 351/161 |
| 5,485,228 | 1/1996 | Roffman et al. | 351/161 |
| 5,493,350 | 2/1996 | Seidner | 351/161 |
| 5,526,071 | 6/1996 | Seidner et al. | 351/161 | ism
MULTIFOCAL CORNEAL CONTACT LENS

BACKGROUND OF THE INVENTION

This invention relates to a multifocal contact lens. More particularly, this invention relates to paired multifocal contact lenses.

Bifocal contact lenses are designed to correct or compensate for a condition of advancing age known as "presbyopia." In a presbyopic eye, the ability to focus at near distances, such as the normal reading distance, and in some cases at intermediate distances, is diminished. The loss of focusing capability is due to hardening of the eye's natural crystalline lens material.

Generally, multifocal contact lenses (usually either bifocal, trifocal or aspheric) are concentric or segmented in configuration. In a conventional bifocal contact lens of the concentric type, a first, centrally located, circular correction zone constitutes either distant or near vision correction, while a second annular correction zone surrounding the first zone provides the corresponding near or distance vision correction, respectively. In a conventional bifocal contact lens of the segmented or translating type, the lens is divided into two somewhat D-shaped zones. Usually the upper area is for distance vision correction, whereas the lower area is for near vision correction. Such conventional segmented contact lenses require some sort of movement of the lens relative to the eye to achieve acceptable visual acuity for both distant and near vision.

It has been discovered that as a presbyopic patient ages, there is generally little change in the prescription for the patient's distance vision (in healthy eyes). However, the near vision prescription requires continual correction. At some point in monovision corrective lenses, when the near vision prescription strength is increased beyond a certain level, it appears that the distance vision of the patient suffers.

OBJECTS OF THE INVENTION

An object of the present invention is to provide a pair of multifocal contact lenses.

Another object of the present is to provide such contact lenses which facilitate vision for emerging and advanced presbyopes.

A further, more particular, object of the present is to provide such contact lenses which do not decrease distance vision where the patient has a substantial correction for near vision.

These and other objects of the present invention will be apparent from the drawings and descriptions set forth herein.

BRIEF DESCRIPTION

A pair of multifocal contact lenses for a patient comprises, in accordance with an embodiment of the present invention, a first corneal contact lens for the distance-seeing eye of the patient and having a concave posterior surface and a convex anterior surface. The anterior surface is formed with a power curve including exactly two vision correction zones, namely, a circular central distance vision correction zone and an annular intermediate vision correction zone contiguous, and concentric or coaxial, with the distance vision correction zone. A second corneal contact lens, for the near-seeing eye of the patient, also has a concave posterior surface and a convex anterior surface. The anterior surface of the second lens is formed with a power curve consisting essentially of a circular central near vision correction zone and an annular intermediate vision correction zone contiguous, and concentrial or coaxial, with the near vision correction zone.

In order to optimize the coexistence of the patient's near vision and distance vision and to reduce the difficulty the advanced presbyope has in maintaining adequate distance vision, the various vision correction zones of the pair of lenses should be limited as to the differences in their corrective powers. In particular, the intermediate vision correction zone of the first lens and the distance vision correction zone should have optical powers differing in magnitude by less than approximately 1.5 diopters. Similarly, the intermediate vision correction zone of the second lens and the near vision correction zone should have optical powers differing in magnitude by less than approximately 1.5 diopters. Thus, neither eye receives image information with multiple focal corrections which differ by more than a predetermined limit.

Generally, in actual practice, the intermediate vision correction zones of the two lenses will have approximately the same corrective power. Accordingly, the distance vision correction zone (the first lens) and the intermediate correction zone of the second lens will have optical powers differing in magnitude by less than approximately 1.5 diopters, while the near vision correction zone (the second lens) and the intermediate vision correction zone of the first lens will have optical powers differing in magnitude by less than approximately 1.5 diopters. This result is believed to be particularly beneficial in that the difference in focal correction of the image information from the two eyes will be circumscribed, thereby facilitating fusing or combining of the image information in the occipital (optical) cortex.

It is contemplated that some difference in the optical powers of the intermediate zones is permissible. However this difference should be no greater than approximately 1.5 diopters.

Preferably, the distance and near vision correction zones each have a diameter of approximately 1.5 to approximately 3 mm, while the intermediate vision correction zones each have a diameter of approximately 2 to approximately 5 mm and the two lenses each have a diameter of approximately 13.5 to 15.0 mm.

The present invention may be used with all standard contact lens materials, i.e., rigid (gas permeable or PMMA), but is preferably used with soft (hydrogel) polymeric materials i.e., polymeric materials which contain at least about 10% by weight water after hydration, such as disclosed in U.S. Pat. Nos. 5,314,960 and 5,314,961.

DESCRIPTION OF THE PREFERRED EMBODIMENTS

Figure 1:
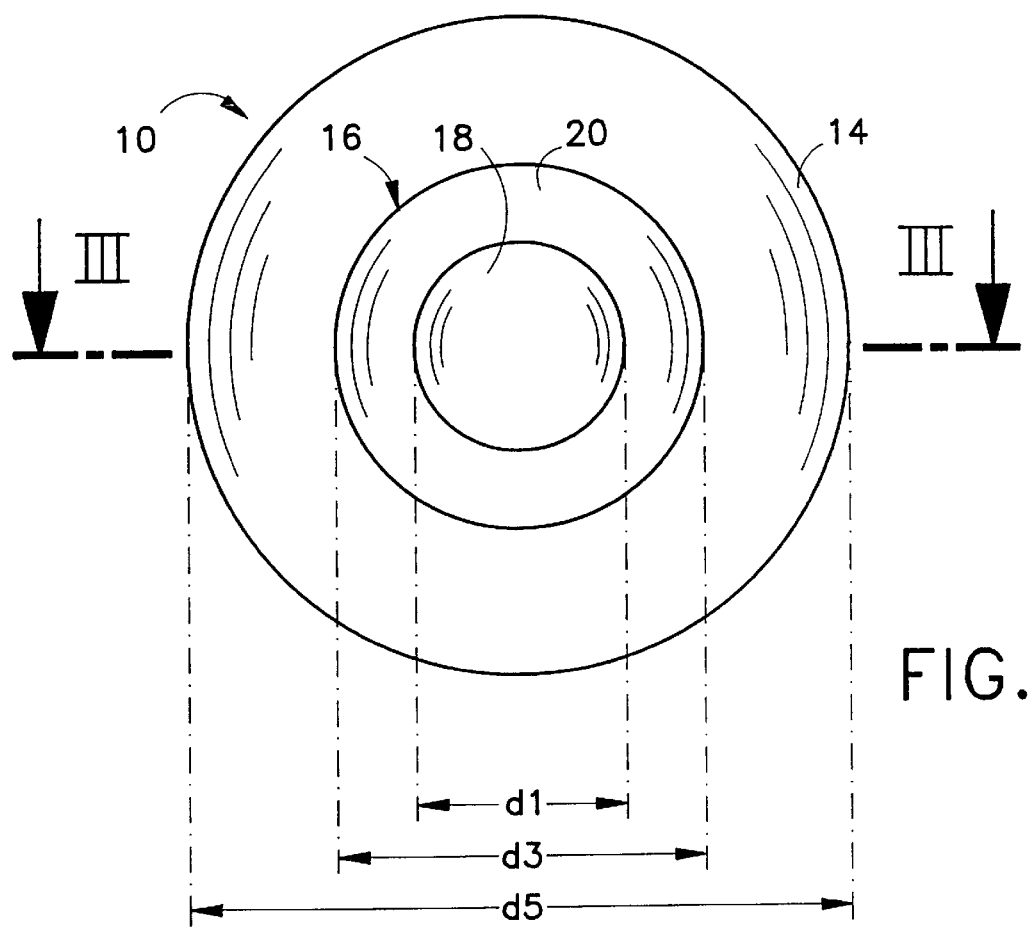
FIG. 1 is a front elevational view showing the anterior surface of a corneal contact lens for a dominant eye of a patient.
Figure 3:
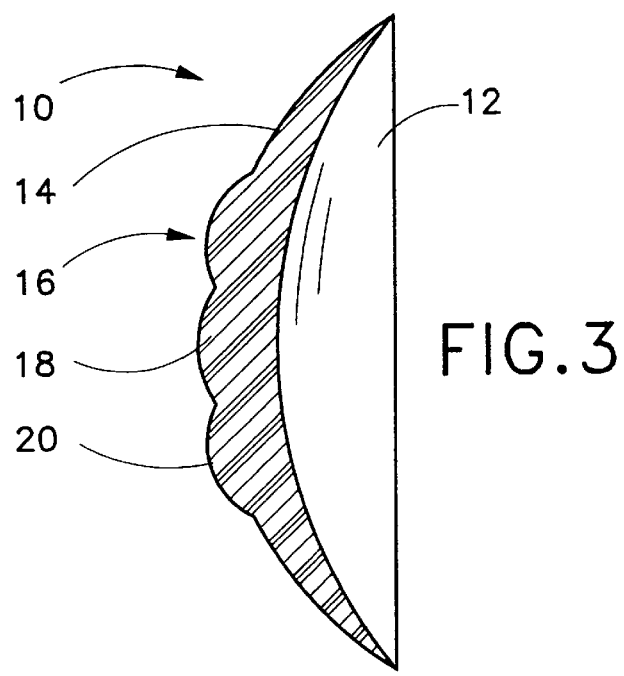
FIG. 3 is a transverse cross-sectional view taken along line III—III in FIG. 1.

The drawings illustrate right and left multifocal corneal contact lenses for a single patient. As shown in FIGS. 1 and 3, a first corneal contact lens 10, for a distance-seeing eye of the patient, has a concave posterior surface 12 and a convex anterior surface 14. Anterior surface 14 is formed with a power curve 16 including a circular distance vision correction zone 18 in the center of the lens and an annular intermediate vision correction zone 20 contiguous with the distance vision correction zone. Annular correction zone 20 is concentric or coaxial with distance vision correction zone 18.

Figure 2:
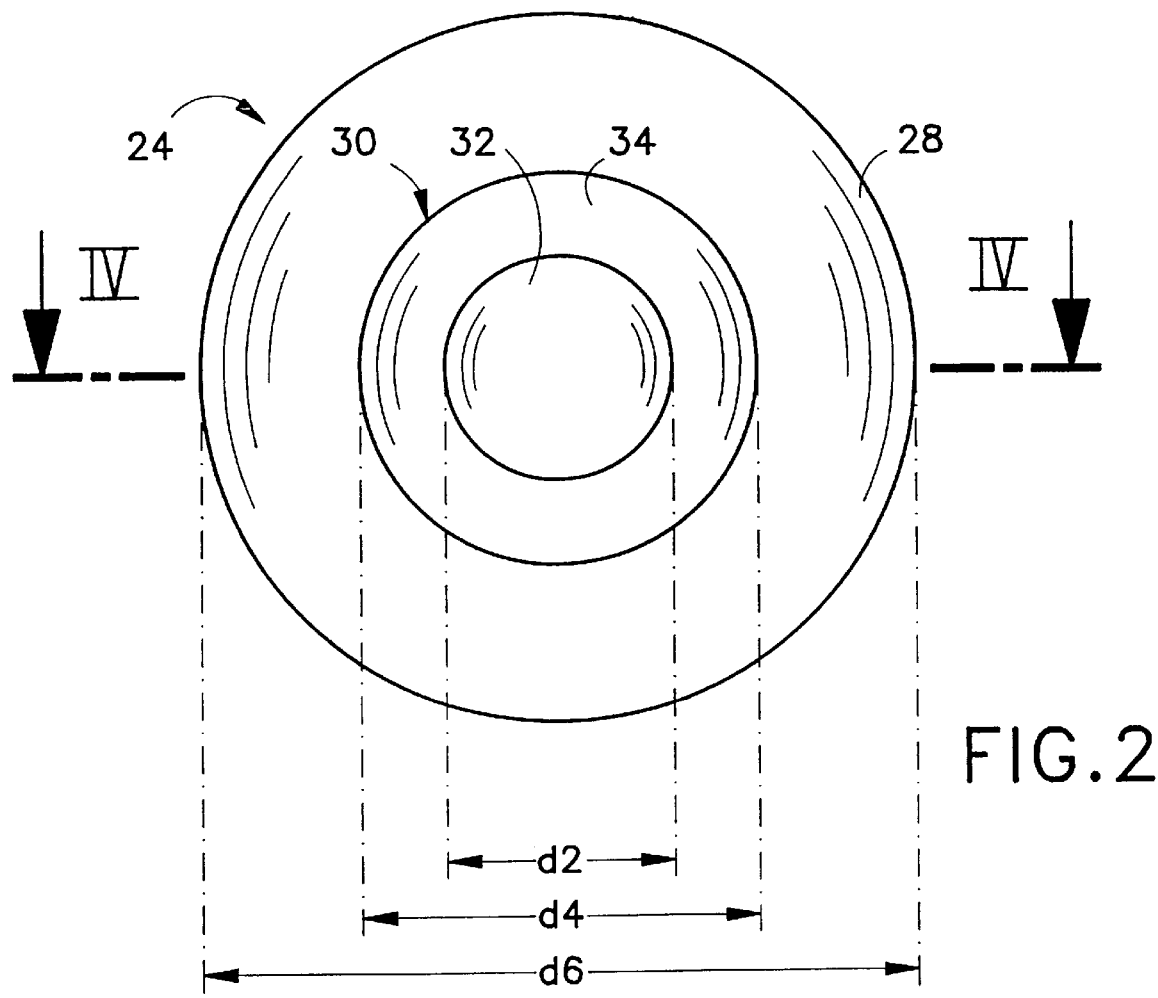
FIG. 2 is a front elevational view showing the anterior surface of a corneal contact lens for a nondominant eye of the same patient.
Figure 4:
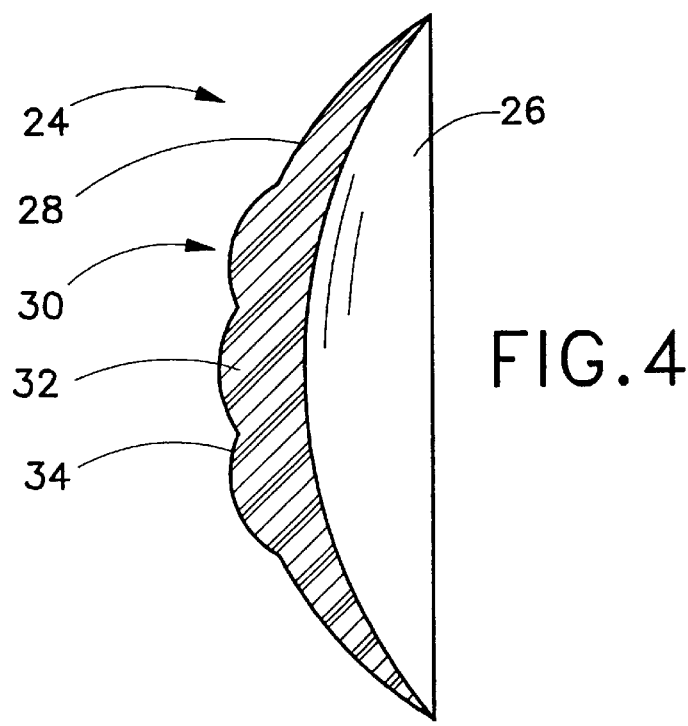
FIG. 4 is a transverse cross-sectional view taken along line IV—IV in FIG. 2.

As depicted in FIGS. 2 and 4, a second corneal contact lens 24 of the matched lens pair, for a near-seeing eye of the patient, has a concave posterior surface 26 and a convex anterior surface 28. Anterior surface 28 is formed with a power curve 30 including a circular near vision correction zone 32 and an annular intermediate vision correction zone 34 contiguous with zone 32. Intermediate vision correction zone 34 is concentric or coaxial with central zone 32.

Contact lens 10 is generally fitted to the patient's dominant eye, while lens 24 is fitted to the nondominant eye. Distance vision is provided by central zone 18 of lens 10, while near vision is provided by central zone 32 of lens 24.

Generally, the intermediate vision provided by zones 20 and 34 covers distances from about two feet to approximately twelve feet from the viewer. Of course, there is substantial variation in the boundaries of this intermediate vision range from person to person. As a broad rule, intermediate vision is used for most activities inside the office, factory or home. Fine precision work and reading are accomplished take place within the near vision range, while activities such as driving require the use of distance vision.

Thus, for most activities of occupational and home life, a patient fitted with lenses 10 and 24 will have stereoscopic or binocular vision because of the use of the annular intermediate zones 20 and 34 of the fitted pair of contact lenses and because there is a 1.5 diopter difference or less between the refractive powers of the annular zones.

Intermediate vision correction zone 20 of dominant lens 10 and distance vision correction zone 18 of that lens have optical powers differing by a maximum magnitude of approximately 1.5 diopters. Similarly, intermediate vision correction zone 34 of nondominant lens 24 and near vision correction zone 32 have optical powers differing by a maximum magnitude of approximately 1.5 diopters. In this way, each eye receives multiply focused image information, corrected for either intermediate and distance vision or intermediate and near vision, wherein the corrections are limited.

In many cases, intermediate vision correction zones 20 and 34 of lenses 10 and 24 will have approximately the same corrective power. Accordingly, distance vision correction zone 18 (dominant lens 10) and intermediate correction zone 34 (nondominant lens 24) will have optical powers differing in magnitude by less than approximately 1.5 diopters. Near vision correction zone 32 (nondominant lens 24) and intermediate vision correction zone 20 (dominant lens 10) will also have optical powers differing in magnitude by less than approximately 1.5 diopters. This result is believed to be particularly beneficial in that the difference in focal correction of the image information from the two eyes will be circumscribed, thereby facilitating fusing or combining of the image information in the occipital (optical) cortex.

It is contemplated that some difference in the optical powers of intermediate zones 20 and 34 is permissible. However this difference should be no greater than approximately 1.5 diopters.

Distance and near vision correction zones 18 and 32 have respective diameters d1 and d2 in a range between approximately 1.5 and approximately 3 mm. Intermediate vision correction zones 20 and 34 have respective diameters d3 and d4 of approximately 2 to approximately 5 mm. Lenses 10 and 24 themselves have respective diameters d5 and d6 between approximately 13.5 and 15.0 mm.

The different optical correction zones of lenses 10 and 24 may be spheric or aspheric. Lenses 10 and 24 may be made of any standard contact lens material, i.e., rigid (gas permeable or PMMA), but are preferably made of soft (hydrogel) polymeric material, i.e., polymeric materials which contain at least about 10% by weight water after hydration, such as disclosed in U.S. Pat. Nos. 5,314,960 and 5,314,961.

It is to be noted that the fit of lenses 10 and 24 may differ. In some cases, near vision lens 24 will be provided with a relatively loose or flatter fit to allow some translating of the lens over the cornea of the nondominant eye for facilitating viewing through near vision 20 correction zone 32. In contrast, lens 10 will generally have a relatively tighter fit to center the lens more securely on the surface of the dominant eye.

For most presbyopic individuals, a pair of multifocal contact lenses 10 and 24 as described herein provides optimal vision correction for most activities of daily life. During work and in home situations, intermediate vision correction zones 20 and 34 are used together most commonly. In near vision or distance vision, the patient uses image information obtained through the near vision correction zone 32 or the distant vision correction zone 18, respectively, with the other eye receiving its "dominant input" from the respective intermediate vision correction zone 20 or 34.

In a first example of a pair of contact lenses 10 and 24 in accordance with the above disclosure, intermediate vision correction zone 20 and distant vision correction zone 18 have respective prescriptions of −0.50 diopters and −1.50 diopters, while intermediate vision correction zone 34 and near vision correction zone 32 have respective prescriptions of −0.50 diopters and +0.50 diopters. This pair of lenses is appropriate for a female patient, age 50.

In a second example of a pair of contact lenses 10 and 24 in accordance with the above disclosure, intermediate vision correction zone 20 and distant vision correction zone 18 have respective prescriptions of −2.25 diopters and −3.00 diopters, while intermediate vision correction zone 34 and near vision correction zone 32 have respective prescriptions of −2.25 diopters and −1.50 diopters. This pair of lenses is appropriate for a female patient, age 45.

In a third example of a pair of contact lenses 10 and 24 in accordance with the above disclosure, intermediate vision correction zone 20 and distant vision correction zone 18 have respective prescriptions of −2.25 diopters and −4.00 diopters, while intermediate vision correction zone 34 and near vision correction zone 32 have respective prescriptions of −1.00 diopters and −1.75 diopters. This pair of lenses is appropriate for a patient, age 60.

The above examples are summarized in the following table:

| Lens Zone | Lens for Distance-Seeing Eye | | Lens for Near-Seeing Eye | |
| --- | --- | --- | --- | --- |
| | Central | Annular | Central | Annular |
| Example 1 | −0.50 | −1.50 | −0.50 | +0.50 |
| Example 2 | −2.25 | −3.00 | −2.25 | −1.50 |
| Example 3 | −2.50 | −4.00 | −1.00 | −1.75 |

It is to be noted that zones 18, and 20 of lens 10 and zones 32 and 34 of lens 24 can be implemented by any combination of spheric and aspheric surfaces.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are offered by way of example to facilitate comprehension of the invention and should not be construed to limit the scope thereof

What is claimed is:

1. A pair of multifocal contact lenses for a patient, comprising:

a first corneal contact lens having a concave posterior surface and a convex first anterior surface, said first anterior surface being formed with a first power curve consisting of a circular central distance vision correction zone and a first annular intermediate vision correction zone contiguous with said distance vision correction zone, said first intermediate vision correction zone being concentric or coaxial with said distance vision correction zone; and a second corneal contact lens having a concave posterior surface and a convex second anterior surface, said second anterior surface being formed with a second power curve consisting essentially of a circular central near vision correction zone and an annular second intermediate vision correction zone contiguous with said near vision correction zone, said second intermediate vision correction zone being concentric or coaxial with said near vision correction zone.

2. The pair of multifocal contact lenses defined in claim 1 wherein said first intermediate vision correction zone and said second intermediate vision correction zone have optical powers differing in magnitude by less than approximately 1.5 diopters.

3. The pair of multifocal contact lenses defined in claim 2 wherein said distance vision correction zone and said second intermediate vision correction zone have optical powers differing in magnitude by less than approximately 1.5 diopters.

4. The pair of multifocal contact lenses defined in claim 3 wherein said near vision correction zone and said first intermediate vision correction zone have optical powers differing in magnitude by less than approximately 1.5 diopters.

5. The pair of multifocal contact lenses defined in claim 2 wherein said first intermediate vision correction zone and said distance vision correction zone have optical powers differing in magnitude by less than approximately 1.5 diopters.

6. The pair of multifocal contact lenses defined in claim 2 wherein said second intermediate vision correction zone and said near vision correction zone have optical powers differing in magnitude by less than approximately 1.5 diopters.

7. The pair of multifocal contact lenses defined in claim 1 wherein said distance vision correction zone and said second intermediate vision correction zone have optical powers differing in magnitude by less than approximately 1.5 diopters.

8. The pair of multifocal contact lenses defined in claim 1 wherein said near vision correction zone and said first intermediate vision correction zone have optical powers differing in magnitude by less than approximately 1.5 diopters.

9. The pair of multifocal contact lenses defined in claim 1 wherein said first intermediate vision correction zone and said distance vision correction zone have optical powers differing in magnitude by less than approximately 1.5 diopters.

10. The pair of multifocal contact lenses defined in claim 1 wherein said second intermediate vision correction zone and said near vision correction zone have optical powers differing in magnitude by less than approximately 1.5 diopters.

11. The pair of multifocal contact lenses defined in claim 1 wherein said distance vision correction zone and said near vision correction zone each have a diameter of approximately 1.5 to approximately 3 mm, said first intermediate vision correction zone and said second intermediate vision correction zone each having a diameter of approximately 2 to approximately 5 mm.

12. A pair of multifocal contact lenses for a patient, comprising:

a first corneal contact lens having a concave posterior surface and a convex first anterior surface, said first anterior surface being formed with a first power curve including exactly two vision correction zones: a circular distance vision correction zone and an annular first intermediate vision correction zone contiguous with said distance vision correction zone, said first intermediate vision correction zone being concentric or coaxial with said distance vision correction zone, said first intermediate vision correction zone and said distance vision correction zone having optical powers which differ in magnitude by less than approximately 1.5 diopters; and a second corneal contact lens having a concave posterior surface and a convex second anterior surface, said second anterior surface being formed with a second power curve including exactly two vision correction zones: a circular near vision correction zone and an annular second intermediate vision correction zone contiguous with said near vision correction zone, said second intermediate vision correction zone being concentric or coaxial with said near vision correction zone, said second intermediate vision correction zone and said near vision correction zone having optical powers which differ in magnitude by less than approximately 1.5 diopters.

13. The pair of multifocal contact lenses defined in claim 12 wherein said first intermediate vision correction zone and said second intermediate vision correction zone have optical powers differing in magnitude by less than approximately 1.5 diopters.

14. The pair of multifocal contact lenses defined in claim 13 wherein said distance vision correction zone and said near vision correction zone each have a diameter of approximately 1.5 to approximately 3 mm, said first intermediate vision correction zone and said second intermediate vision correction zone each having a diameter of approximately 2 to approximately 5 mm.

* * * * *